(12) United States Patent
Song et al.

(10) Patent No.: US 8,625,724 B2
(45) Date of Patent: Jan. 7, 2014

(54) ADAPTIVE TRACKING STEPS FOR TIME AND FREQUENCY TRACKING LOOPS

(75) Inventors: Wei-Jei Song, San Diego, CA (US); Sivaram S. Palakodety, San Diego, CA (US); Feng Lu, San Diego, CA (US); Youngjae Kim, San Diego, CA (US); Anil Kumar Goteti, San Diego, CA (US); Danlu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 699 days.

(21) Appl. No.: 12/569,039

(22) Filed: Sep. 29, 2009

(65) Prior Publication Data

US 2010/0232488 A1  Sep. 16, 2010

Related U.S. Application Data

(60) Provisional application No. 61/158,836, filed on Mar. 10, 2009.

(51) Int. Cl.
*H04L 27/06* (2006.01)

(52) U.S. Cl.
USPC ............................. 375/344; 375/260; 375/267

(58) Field of Classification Search
USPC .................................. 375/316, 344, 260, 267
See application file for complete search history.

(56) References Cited

U.S. PATENT DOCUMENTS

| | | | |
|---|---|---|---|
| 4,268,853 A * | 5/1981 | Nakamura et al. | 348/521 |
| 4,458,355 A | 7/1984 | Motley et al. | |
| 4,520,320 A * | 5/1985 | Potzick et al. | 327/7 |
| 4,691,176 A | 9/1987 | Hsiung et al. | |
| 5,384,550 A | 1/1995 | Henely et al. | |
| 5,450,447 A | 9/1995 | Dutta | |
| 5,757,858 A | 5/1998 | Black et al. | |
| 5,828,705 A * | 10/1998 | Kroeger et al. | 375/326 |
| 6,278,867 B1 | 8/2001 | Northcutt et al. | |
| 6,696,886 B1 | 2/2004 | Ke et al. | |
| 6,738,608 B2 * | 5/2004 | Black et al. | 455/260 |
| 7,099,639 B2 | 8/2006 | Akahori | |
| 7,263,349 B2 | 8/2007 | Sih et al. | |
| 7,599,698 B2 * | 10/2009 | Cheng et al. | 455/452.2 |
| 7,706,474 B2 | 4/2010 | Kroeger et al. | |
| 8,422,955 B2 | 4/2013 | Smee et al. | |
| 2003/0186666 A1 * | 10/2003 | Sindhushayana | 455/260 |

(Continued)

FOREIGN PATENT DOCUMENTS

| | | |
|---|---|---|
| CN | 1216420 A | 5/1999 |
| JP | 2005522896 A | 7/2005 |
| JP | 2005537752 A | 12/2005 |

OTHER PUBLICATIONS

International Search Report and Written Opinion—PCT/US2010/026866—International Search Authority—European Patent Office—May 31, 2010.

(Continued)

*Primary Examiner* — Chieh M Fan
*Assistant Examiner* — Freshteh N Aghdam
(74) *Attorney, Agent, or Firm* — Charles Chesney

(57) ABSTRACT

A wireless communications method is provided. The method includes analyzing one or more channel conditions from a wireless communication and automatically adjusting a frequency tracking loop gain or a time tracking loop gain in view of the channel conditions.

37 Claims, 14 Drawing Sheets

(56) References Cited

U.S. PATENT DOCUMENTS

| | | |
|---|---|---|
| 2004/0116121 A1 | 6/2004 | Sendonaris |
| 2006/0056533 A1* | 3/2006 | Molisch et al. ............... 375/267 |
| 2007/0071123 A1 | 3/2007 | Charbit |
| 2007/0127559 A1* | 6/2007 | Chang ............................ 375/213 |
| 2007/0183484 A1 | 8/2007 | Brehler et al. |
| 2007/0210731 A1* | 9/2007 | Yoshiura et al. .............. 318/163 |
| 2008/0116941 A1 | 5/2008 | Ekbal et al. |
| 2008/0291981 A1* | 11/2008 | Jonsson et al. ................ 375/148 |

OTHER PUBLICATIONS

Taiwan Search Report-TW099106982-TIPO-Apr. 5, 2013 (080824TW).

* cited by examiner

ADAPTIVE TRACKING STEPS FOR TIME AND FREQUENCY TRACKING LOOPS

CLAIM OF PRIORITY UNDER 35 U.S.C. §119

This application claims the benefit of U.S. Provisional Patent Application No. 61/158,836, entitled ADAPTIVE TRACKING STEPS FOR TIME AND FREQUENCY TRACKING LOOPS, and filed on Mar. 10, 2009, the entirety of which is incorporated herein by reference.

BACKGROUND

I. Field

The following description relates generally to wireless communications systems, and more particularly to methods for adaptive controls for time and frequency tracking in wireless communications systems.

II. Background

Wireless communication systems are widely deployed to provide various types of communication content such as voice, data, and so forth. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems including E-UTRA, and orthogonal frequency division multiple access (OFDMA) systems.

An orthogonal frequency division multiplex (OFDM) communication system effectively partitions the overall system bandwidth into multiple ($N_F$) subcarriers, which may also be referred to as frequency sub-channels, tones, or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval that may be dependent on the bandwidth of each frequency subcarrier, a modulation symbol may be transmitted on each of the frequency subcarriers. Thus, OFDM may be used to combat inter-symbol interference (ISI) caused by frequency selective fading, which is characterized by different amounts of attenuation across the system bandwidth.

Generally, a wireless multiple-access communication system can concurrently support communication for multiple wireless terminals that communicate with one or more base stations via transmissions on forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

The aforementioned systems and protocols are often subject to extreme changes in conditions. Such conditions include "urban canyon" situations where in one portion of a city conditions might be ideal and when moving behind a building, conditions may be poor. Fixed or non-optimized tracking gains were used for the tracking loops in many of these systems. The problem with fixed tracking is that time and/or frequency tracking is either too slow for urban canyon or too fast and jittery for high geometry, line of site/sight stationary Internet connections, for example. Thus, single tracking step/gains are not optimal for either case. A sub-optimal solution is possible for voice connections but can promote obvious unrealized capacity gain for Internet (e.g., streaming, download) connections. Legacy frequency tracking loops/time tracking loops (FTL/TTL) structure employs a fixed loop gain regardless of the channel conditions. This loop gain, however, was designed for the worst case of very low geometry. In high geometry or good signal conditions, such fixed setting of loop gain for worst case is not optimal for such conditions.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

Systems and methods provide adaptive tracking steps for time and frequency tracking loops in wireless communications equipment. Signal conditions are automatically analyzed to determine present signal quality for a given location of a device. For instance, it may be determined that a device is in a given high geometry location and respective tracking gains for time or frequency loops can be automatically decreased. In a low geometry situations where signal conditions are detected as poor, time or frequency loop gains can be automatically increased. Such adaptive adjustments to detected conditions are controlled in a smooth and incremental manner via adaptive step control. This type of control enables time or frequency loop gains to be automatically tracked to the detected conditions while minimizing overshoot (e.g., going past desired gain positions) and optimizing the wireless receiver in view of the detected conditions.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

Systems and methods are provided to facilitate wireless communications. In one aspect, a wireless communications method is provided. The method includes analyzing one or more channel condition parameters from a wireless communication and automatically adjusting a frequency tracking loop gain or a time tracking loop gain in view of the channel condition parameters. The channel condition parameters can be based on an energy of pilot chip versus noise and total interference parameter (Ecp/Nt), for example.

It is noted that in one or more exemplary embodiments described herein, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blue-ray disc where disks usually reproduce data magnetically, while discs reproduce data optically with lasers. Combinations of the above should also be included within the scope of computer-readable media.

Figure 1:
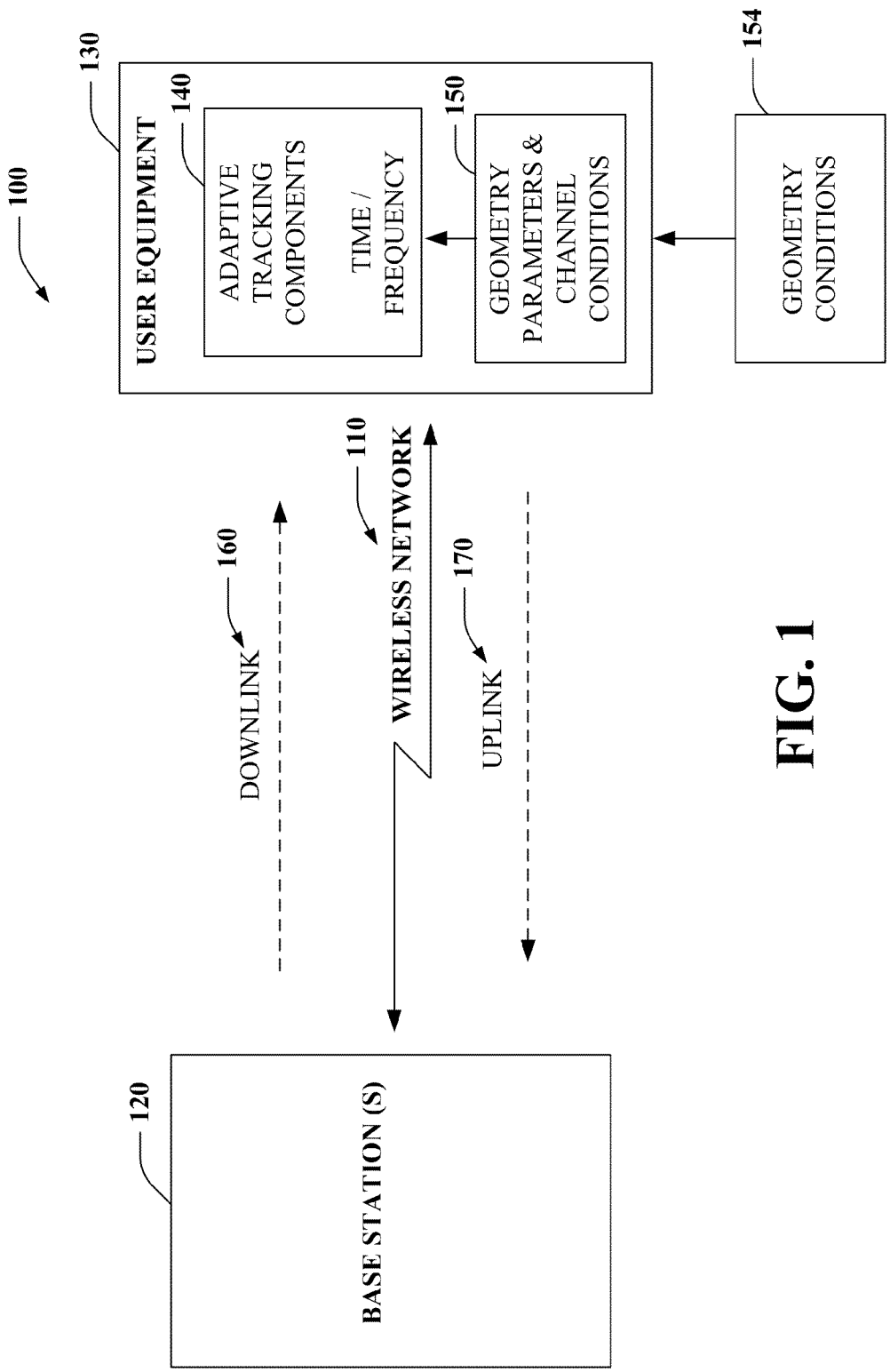
FIG. 1 is a high-level block diagram of a system that provides adaptive tracking for time and frequency tracking loops in a wireless communications network.

Referring now to FIG. 1, a system 100 provides adaptive tracking for time and frequency tracking loops for a wireless communications network 110. The system 100 includes one or more base stations 120 (also referred to as a node, evolved node B—eNB, serving eNB, target eNB, femto station, pico station) which can be an entity capable of communication over the wireless network 110 to various devices 130. For instance, each device 130 can be an access terminal (also referred to as terminal, user equipment, mobility management entity (MME) or mobile device). The device 130 can include an adaptive tracking component 140 (or components) that analyze geometry parameters or channel conditions 150 to facilitate automated step adjustments for variances in received wireless signals. The user equipment 130 can analyze geometry conditions 154 on location and during motion of the equipment from one location to another. It is noted that although not shown, the base station 120 (or other wireless nodes on the network 100) can also include adaptive tracking. As shown, the base station 120 communicates to the station 130 via downlink 160 and receives data via uplink 170. Such designation as uplink and downlink is arbitrary as the device 130 can also transmit data via downlink and receive data via uplink channels. It is noted that although two components 120 and 130 are shown, that more than two components can be employed on the network 110, where such additional components can also be adapted for signal processing described herein.

In general, the system 100 provides adaptive tracking steps for time and frequency tracking loops in wireless communications equipment 130. Signal conditions are automatically analyzed to determine present signal quality for a given location of a device. For instance, it may be determined that a device is in a given high geometry location and respective tracking gains for time or frequency loops can be automatically decreased. In a low geometry situations where signal conditions are detected as poor, time or frequency loop gains can be automatically increased. Such adaptive adjustments to detected conditions are controlled in a smooth and incremental manner via adaptive step control. This type of control enables time or frequency loop gains to be automatically tracked to the detected conditions while minimizing overshoot (e.g., going past desired gain positions) and optimizing the wireless receiver in view of the detected conditions.

In one aspect, the system 100 dynamically changes frequency tracking loop/time tracking loop (FTL/TTL) gains depending on detected channel conditions. For example, Ecp/Nt can be employed as a metric to the channel condition and automated changes can be adjusted for FTL/TTL gains. It is noted that Ecp/Nt is used to incorporate the cell-loading effect and is but one of many parameters that can be analyzed to dynamically adjust gains.

In general, mobile devices 130 constantly undergo some type of fading. The devices are seldom stationary when a voice or data call is activated. Even if the device 130 is used for hand-free mode, cars are moving or the surroundings are moving and thus the environment changes continually. With the Internet usage, however, more and more mobile phones can enter a quasi-stationary mode when the surrounding is relatively stationary. This prompts the need for the optimization for the extreme case when the phone or device 130 is enjoying high capacity due to its vicinity to the base station 120 and the stationary connection. As will be shown in more detail below, gain step sizes should be kept at the minimum for this scenario to realize the most benefit. The other common operation environment is urban canyon where the dynamic environment favors larger tracking steps. High Doppler also falls into a similar category.

The system 100 can account for DL (Down Link) power, tracking loop errors (when and if available), Ecp/Nt, Ec/Io, Doppler (when and if available), and so forth to automatically determine the optimum step sizes for the tracking loops for the next slot or frame time. Although the system can be employed for wireless traffic processing, the system can also be integrated into a searcher component as will be described in more detail below. A signal-to-noise ratio (SNR) parameter can be employed as a metric that drives the optimization mechanism in the adaptive tracking component 140. Two common SNR metrics, Ecp/Nt and Ecp/Io are slightly different. By definition, Ecp/Nt, is a pilot energy over noise plus interference ratio and Ecp/Io, is the pilot energy over the total receive energy. Ecp/Nt is more indicative of the capacity and Ecp/Io is more indicative of the current transmission efficiency and both parameters are useful metrics for optimal system design and improvement.

In another aspect, the system 100 can be employed to implement a wireless communications method. This includes analyzing one or more geometry parameters from a wireless communication and determining one or more channel conditions based in part on the geometry parameters. This also includes automatically adjusting a frequency tracking loop gain or a time tracking loop gain in a wireless receiver in view of the determined channel conditions or geometry parameters. The channel conditions are based in part on an energy of pilot chip versus total receive energy parameter (Ecp/Io), a signal to noise ratio (SNR), or can be based on a pilot energy over noise plus interference ratio (Ecp/Nt), for example. The channel conditions or geometry parameters can also be based on downlink power, uplink power, tracking loop errors, detected urban conditions, or Doppler parameters.

The method includes incrementally increasing or decreasing step gain parameters based in part on the channel conditions or the geometry parameters. This includes automatically adjusting the frequency tracking loop gain or the time tracking loop gain in accordance with a demodulator component. Similarly, the method includes automatically adjusting the frequency tracking loop gain or the time tracking loop gain in accordance with a searcher component. In another aspect, the method or system includes automatically adjusting the frequency tracking loop gain or the time tracking loop gain in accordance with a rake, an equalizer, or a finger component. This can include analyzing operating conditions including high geometry, low geometry, or stationary, and optimizing gains in a rake or an equalizer in view of the operating conditions. Another aspect includes analyzing a channel status indicator (CSI) to optimize a feedback rate for a multiple-in, multiple-out (MIMO) system. This can also include analyzing geometry conditions to determine optimal time tracking loop gains or analyzing geometry conditions to determine optimal frequency tracking loop gains. The method includes analyzing time or frequency deviation to determine optimal loop gains or adjusting a time tracking loop to mitigate rake timing fluctuations or adjusting a frequency tracking loop to optimize a channel impulse response (CIR). As can be appreciated, other components or parameters can also be optimized according to the adaptable step gains described herein.

Before proceeding, it is noted that the system 100 can be employed with an access terminal or mobile device, and can be, for instance, a module such as an SD card, a network card, a wireless network card, a computer (including laptops, desktops, personal digital assistants (PDAs)), mobile phones, smart phones, or any other suitable terminal that can be utilized to access a network. The terminal accesses the network by way of an access component (not shown). In one example, a connection between the terminal and the access components may be wireless in nature, in which access components may be the base station and the mobile device is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA), or any other suitable protocol.

Access components can be an access node associated with a wired network or a wireless network. To that end, access components can be, for instance, a router, a switch, or the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

Figure 2:
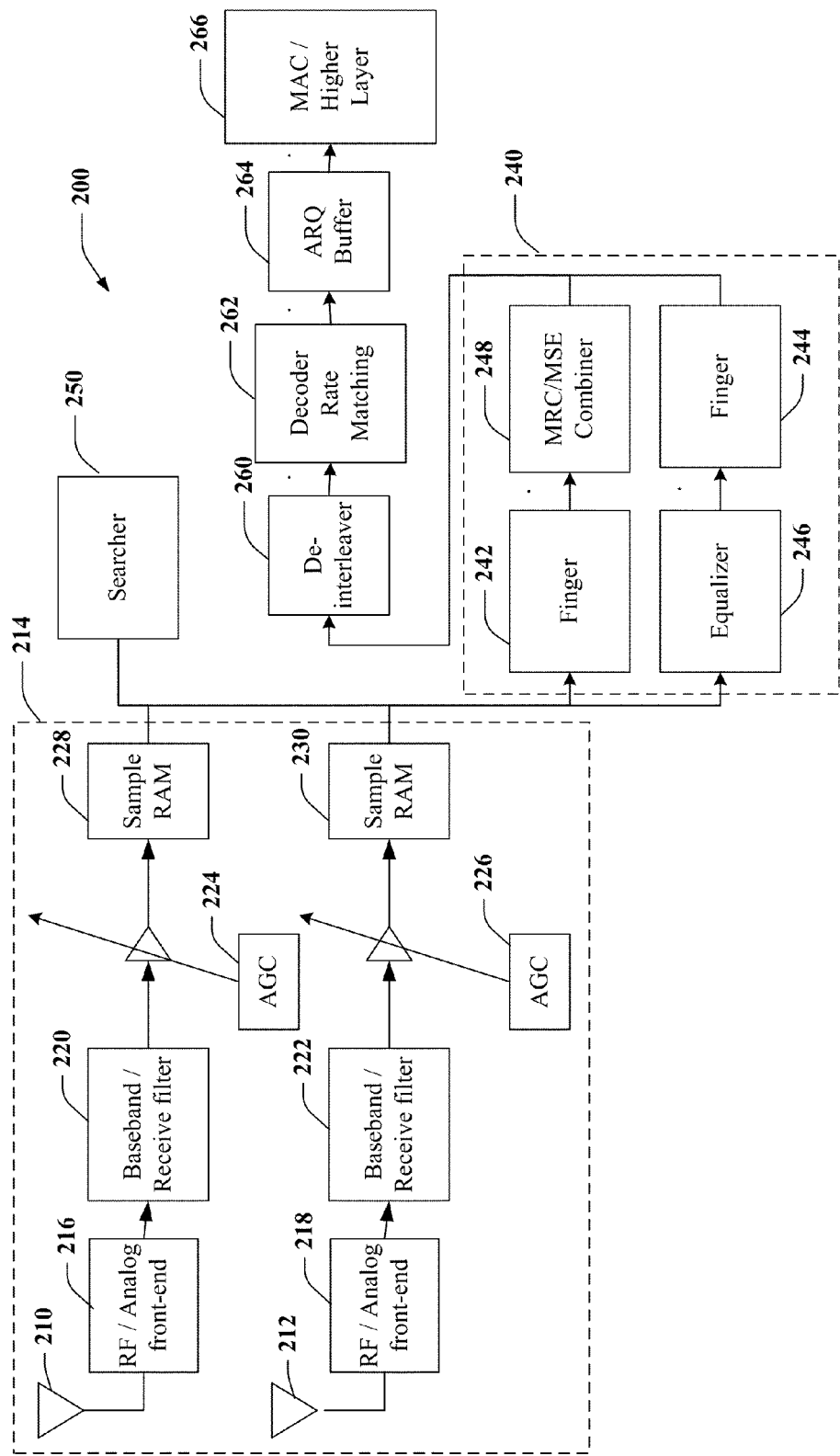
FIG. 2 is a high-level block diagram of an example circuit where adaptive tracking can be employed for a wireless system.

Referring now to FIG. 2, an example high-level system 200 is illustrated where adaptive tracking can be employed. For purposes of brevity, not every component in the system 200 is described in detail. A multi-antenna input 210, 212 is shown at block 214 where the respective inputs and associated processing may include RF/analog front-ends 216, 218, baseband/receiver filter components 220, 222, automatic gain control circuits 224, 226, and signal sampling memories 228, 230. A rake component 240 can include finger components 242, 244, an equalizer 246, and a combiner 248. The rake component 240 is one possible location for the adaptive tracking described herein. Another possible location for adaptive tracking includes a searcher component 250. Other components in the system 200 include de-interleaver components 260, decoders 262, buffers 264, and media layer processing circuits 266.

Through the extracting of system information, the mobile device can determine the operating condition as high or low geometry, dynamic, or relatively stationary, for example. The information assists optimizing the Rake as well as Equalizer performance. It can also serve for better and efficient CSI (Channel Status Indicator) feedback rate for MIMO system. The systems described herein can be error-rated to provide an adaptive step size similar to echo cancellation or with normalized step size or gain. This improves both Rake and Equalizer performance, for example. Thus, the subject systems and methods focus on capacity regardless of the environment. For instance, the systems described herein will operate well in urban canyon conditions when the distance from user equipment to NodeB is fairly close but the drop-off is sharp. The urban canyon condition and others cause alternating low geometry and high geometry scenarios and promote rapid changes in operating environment, where adaptive tracking is employed to achieve optimal performance overall in view of such conditions.

Figure 3:
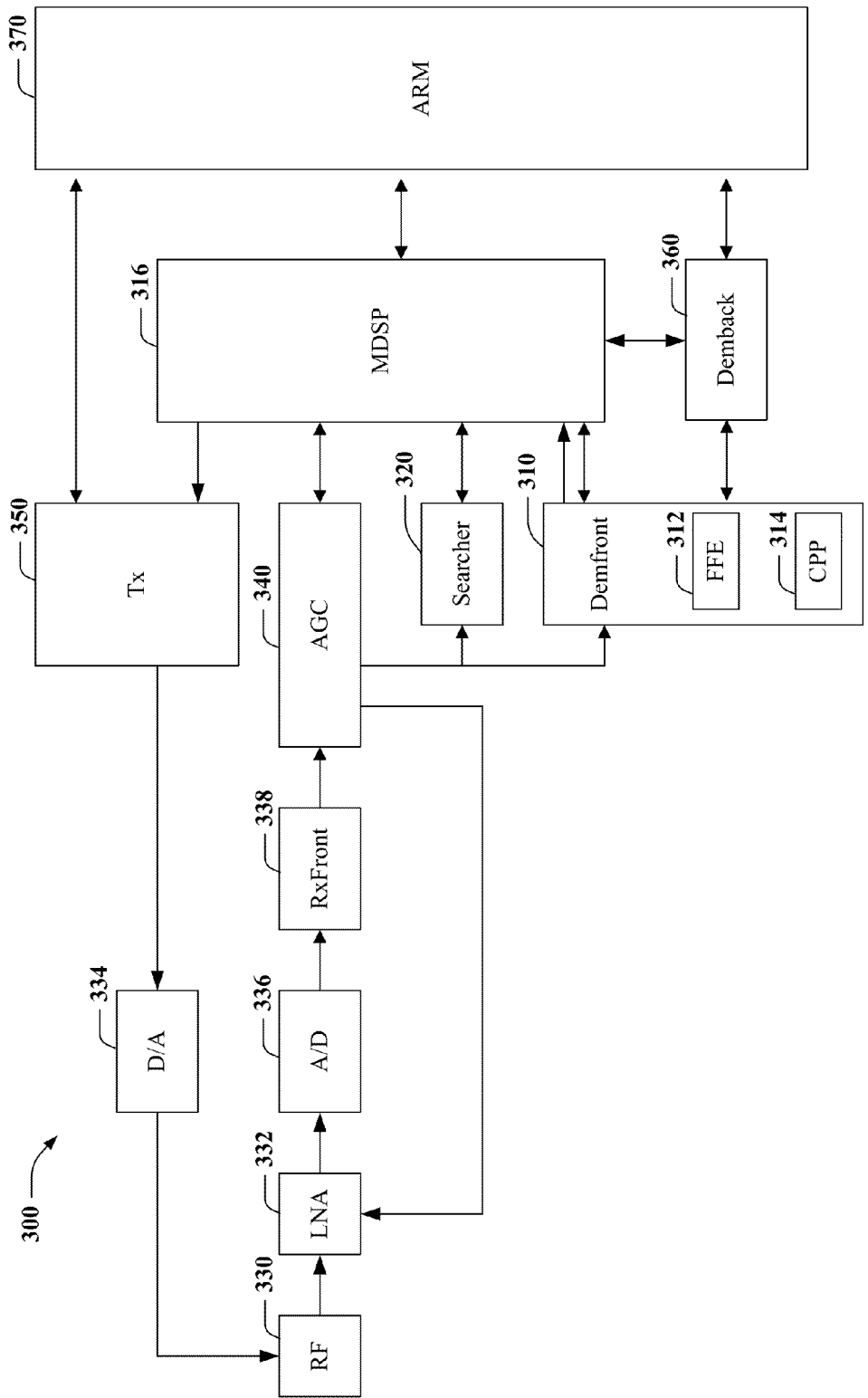
FIG. 3 is a high-level block diagram of an alternative example circuit where adaptive tracking can be employed for a wireless system.

Turning to FIG. 3, an alternative circuit example 300 is illustrated that can employ adaptive tracking The circuit 300 illustrates an example modulator/demodulator architecture that can employ adaptive tracking In one aspect, adaptive tracking components (frequency and/or time tracking components) can be located in a DemFront 310 (Demodulator Front) DFE, which consists of an FFE (Finger front end) 312 and a CPP (Common Pilot Processor) 314. The FFE 312 processes Pn position and time tracking, frequency error correction via rotator, and descrambling unit. The CPP 314 processes common pilot signal processing functions such as pilot filtering, frequency tracking loop (FTL) for rotator, time tracking loop (TTL), and received signal strength indicator (RSSI) filtering.

The CPP 314 also feeds other DemFront 310 parts such as a modem digital signal processor (MDSP) 316 with filtered outputs, enabling demodulation, CQI estimation, finger management, and so forth. Adaptive tracking steps improves the overall receiver performance and channel efficiency, thus the user experience as well by optimizing the TTL and FTL performance. As can be appreciated, other components can integrate adaptive tracking features such as in a searcher component 320, for example. Other components in the circuit 300 include radio frequency (RF) processors 330, low noise amplifiers 332, D/A and A/D converters 334 and 336 respectively, receiver front ends 338, automatic gain controls 340, transmitter components 350, other demodulator components 360, and a general processor such as an advanced RISC (reduced instruction set) machine (ARM) 370, for example.

In another aspect, the circuit 300 can be provided as a communications apparatus. The apparatus includes a demodulator component (e.g., DemFront 310) to determine one or more channel condition parameters from a wireless communication. The apparatus includes a finger component (e.g., FFE 312) to analyze time tracking parameters or frequency error parameters in accordance with the channel condition parameters. The apparatus also includes a common pilot processor (e.g., CPP 314) to automatically adjust a frequency tracking loop gain or a time tracking loop gain in a wireless receiver in view of the time tracking parameters, the frequency error parameters, or the channel condition parameters. The common pilot processor can be operatively coupled to a modem digital signal processor (MDSP) with filtered outputs, where the MDSP enables demodulation, channel quality estimation, or finger management, for example. The communications apparatus can include a searcher component (e.g., 320) to adjust the frequency tracking loop gain or the time tracking loop gain in the wireless receiver. The communications apparatus can also include a radio frequency (RF) processor (e.g., 330), a low noise amplifier (e.g., 332), an automatic gain control (e.g., 340), a transmitter component (e.g., 350), or a general processor (e.g., 370) to adjust the frequency tracking loop gain or the time tracking loop gain in the wireless receiver.

Figure 4:
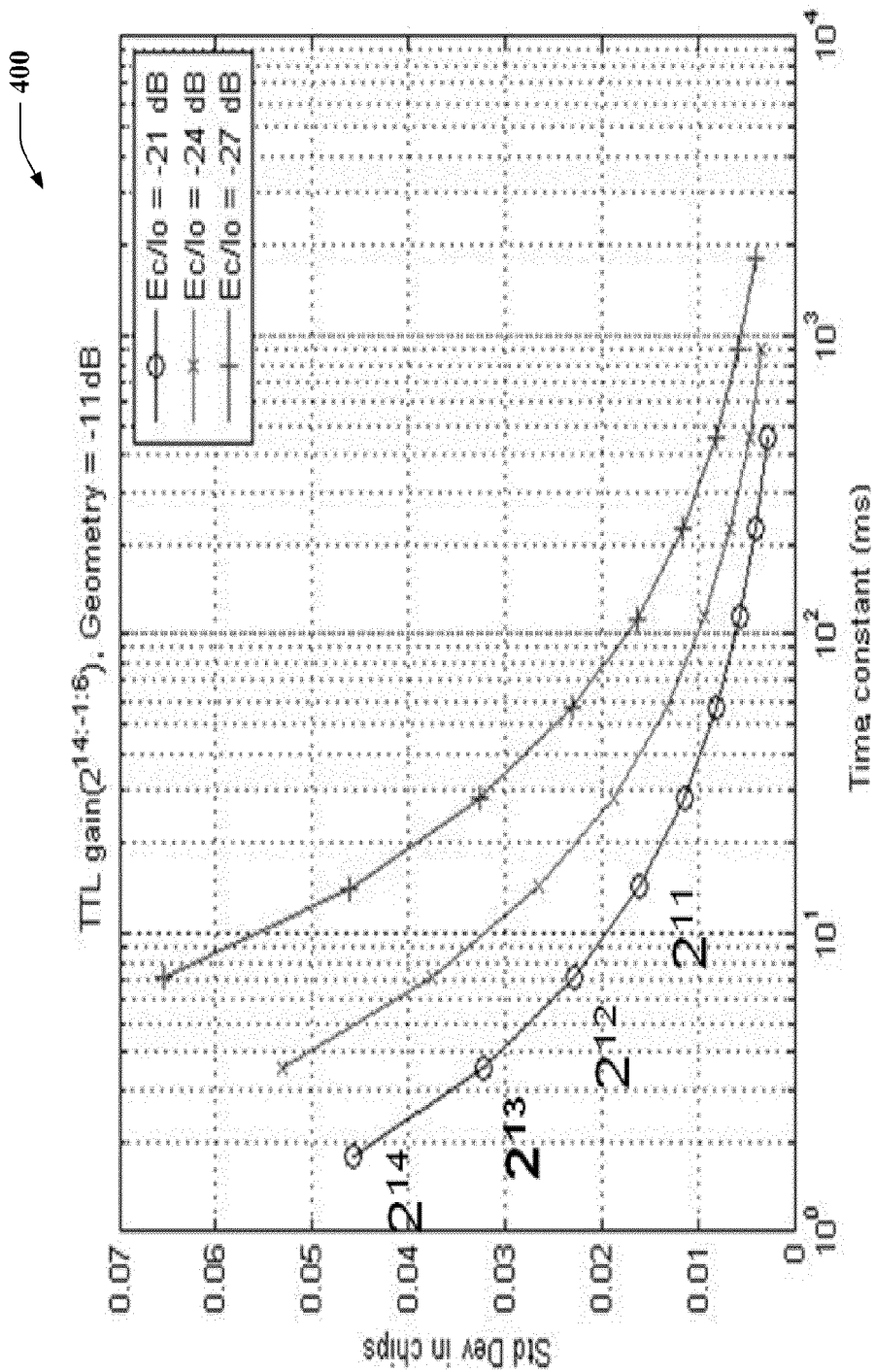
FIGS. 4-7 illustrate graphs that demonstrate how adaptive tracking steps can be selected and determined.
Figure 5:
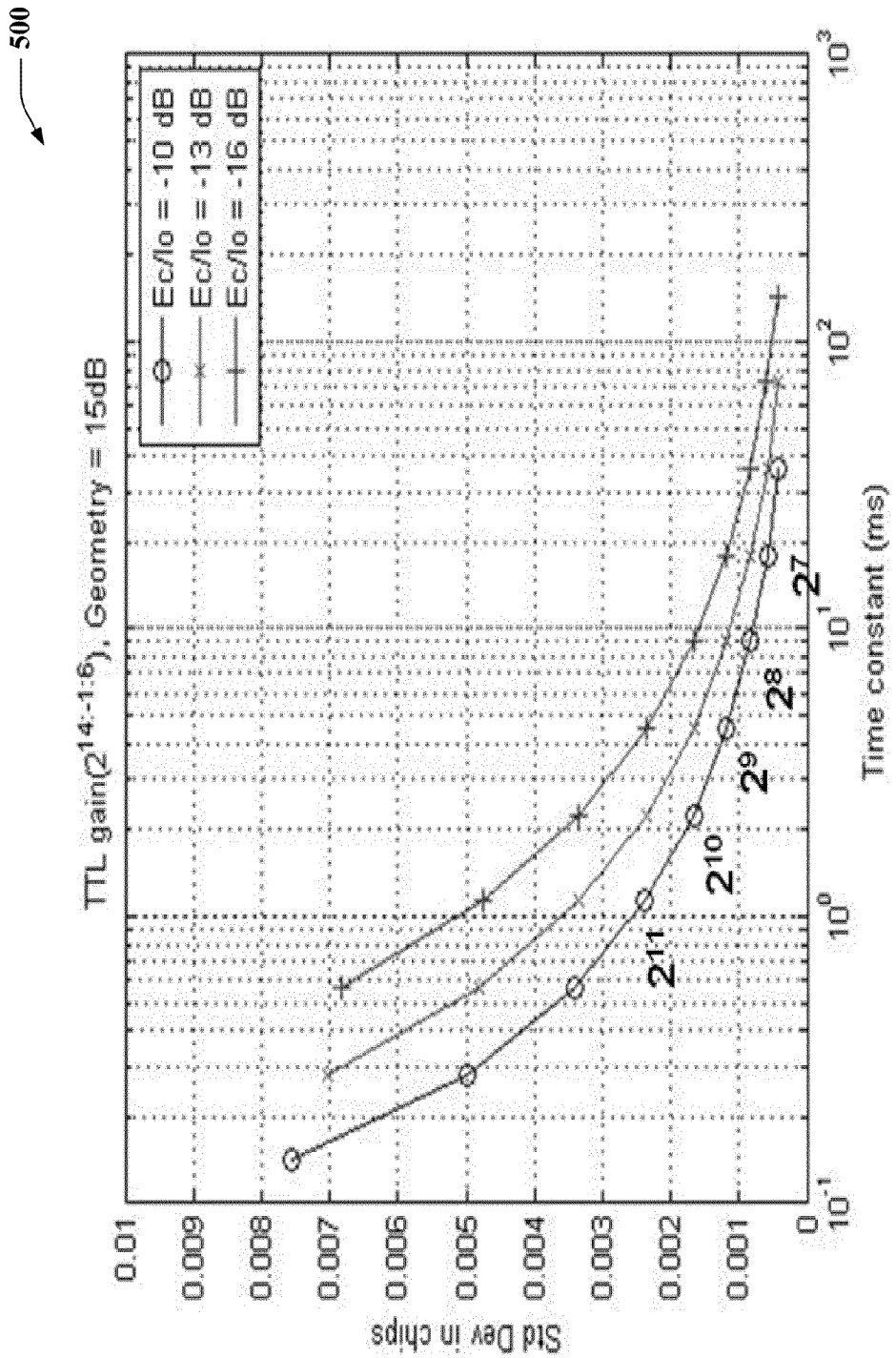

FIGS. 4-7 illustrate graphs that demonstrate how adaptive tracking steps can be selected and determined. As demonstrated in simulation and lab testing, it was discovered that the relation between the timing jitter (measured in standard deviation) and the time tracking loop (TTL) TC (time constant). Two measurement points were taken for high and low geometry respectively to derive the optimal curve. There exists a trade-off between the standard deviation of timing jitter and a time constant (TC). FIG. 4 illustrates this case when the geometry is very low, i.e., −11 dB. Based on this analysis, the default gain has been set to 4096 (=2^12). Now, if the same logic is applied to the high geometry of 15 dB, the plots in FIG. 5 are generated.

Note that timing jitter is very low compared with that of the low-geometry case. Based on the FIGS. 4 and 5, select the TTL loop gain that minimizes the timing jitter as much as possible while maintaining the time constant similar to that of the low-geometry case. For example, select 256(=2^8) in this channel condition. The optimal time constant between and around the two geometries can be extrapolated and interpolated to cover the operating geometries. A similar analysis leads one to select 1024 FTL loop gain for −11 dB geometry and 64 for 15 dB geometry, for example. Similar procedures are provided in interpolation and extrapolation to cover the operating geometries. The previous analysis are for −11 dB and 15 dB geometries. In the following section, sweep the geometry from −11 dB to 15 dB and calculate the appropriate loop gains. The following criteria are used to determine suitable loop gains.

Loop gain selection criteria (criterion 1): Select the loop gain that minimizes the time/frequency jitter as much as possible while satisfying the following conditions:
- In the case of TTL: standard deviation of timing jitter <0.04 chip, time constant <10 ms.
- In the case of FTL: standard deviation of timing jitter <40 Hz, time constant <3.7 ms. Different criteria can be used in FTL and TTL in order to be consistent with the previous default loop gains.

Figure 6:
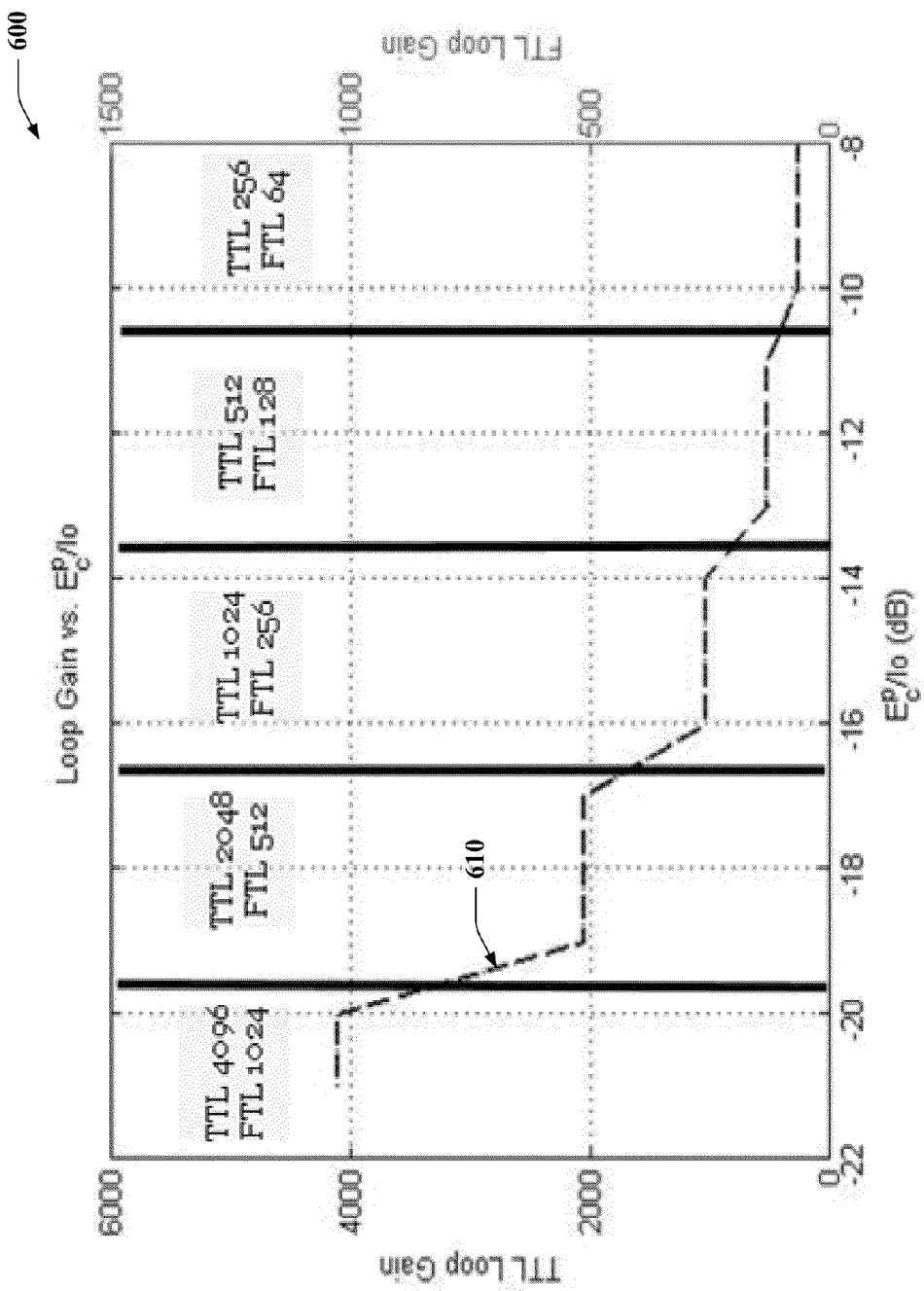
Figure 7:
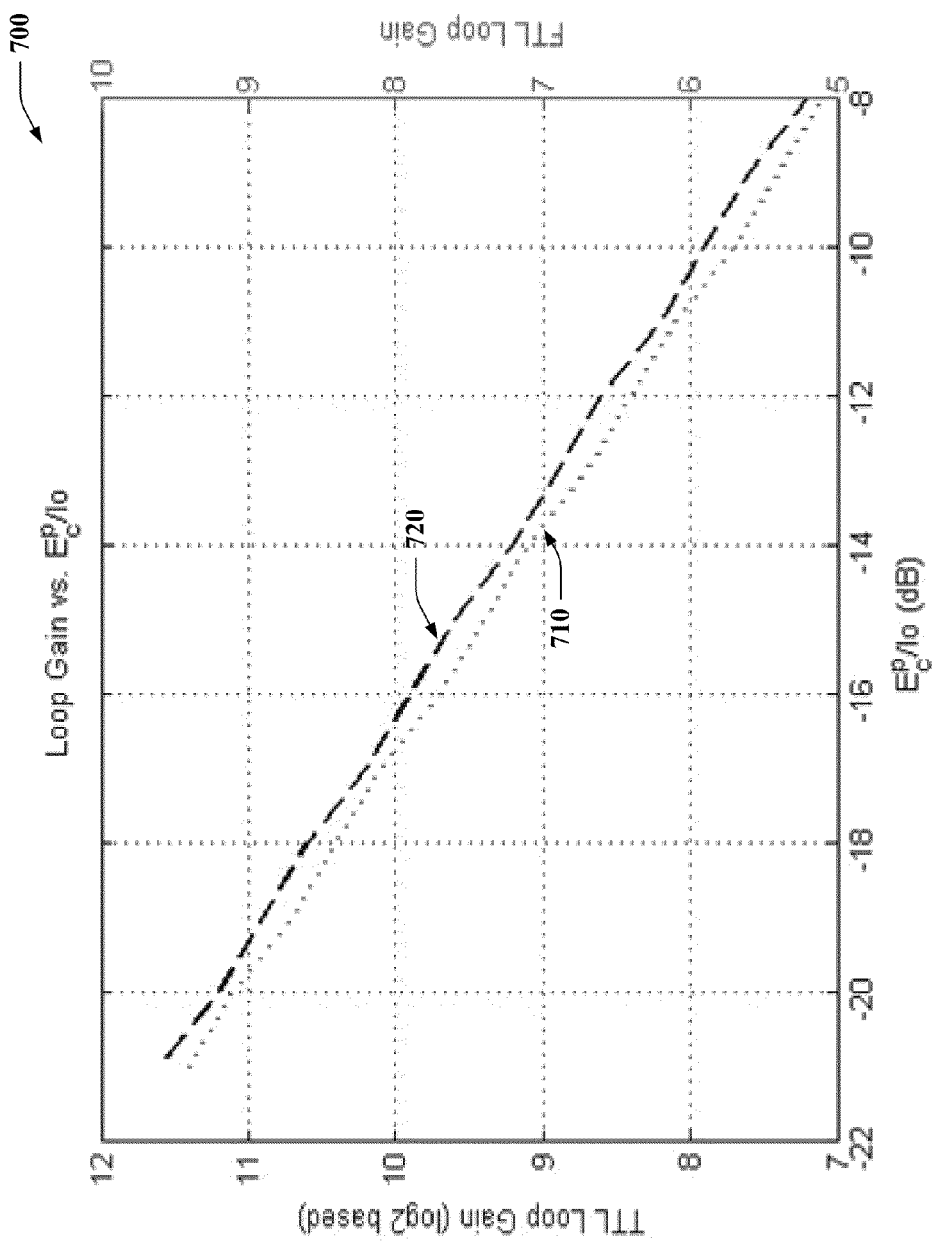

FIG. 6 illustrates a line 610 of the combined and calculated TTL/FTL gains based on criteria 1 above, where the loop gains are limited to the integer exponentials of 2. Note that the FTL gain is set to a factor of four lower than the TTL gain at any portion of the line 610 (e.g., if TTL gain is set to 4096 on line 610 then FTL gain is set to 1024 at same point of line 610). Due to the implementation preference, a linear formula is used instead of a look-up table. The relationship turned out to be pretty linear in a log-log domain, which is shown in FIG. 7, where dotted line 710 represents TTL gain and dashed line 720 represents FTL gains. Using MMSE criteria, these two curves can be approximated by:

TTL: $\log 2(TTLgain) = -0.3341*(Ecp/Io) + 4.5560$

FTL: $\log 2(FTLgain) = -0.3330*(Ecp/Io) + 2.4077$, where Ecp/Io is in dB unit.

In fact, $10*\log_{10}(9*(2^{11})*Ecp/Io)$ is available from the channel quality indicator (CQI) algorithm. Denote this as X. Then, from the above relationship, implement this table as:

For TTL: $TTLgain = 2^{\wedge}(19 - Gaussian(X/3))$

For FTL: $FTLgain = 2^{\wedge}(17 - Gaussian(X/3))$, where [A] is the integer that is not greater than A. For robustness, limit the dynamic range of TTL/FTL gains as follows.

[123,32]<=[TTL, FTL]<=[4096,1024]

Lower TTL loop gains can be applied for Rake to avoid timing jitter. The TTL typically plays a more dominant role in the Rake than the Equalizer. Lower FTL loop gains can be applied for Equalizer to improve CIR estimate thus less FTL jitter, whereas the TTL is less relevant. The optimal step size makes a difference in the receiver performance while operating in high geometry conditions. The major benefit of a 3G network is the capacity as it allows for download in high data rates while in high geometry. The improvement is significant in the user experience as well as the channel efficiency. This improvement is particularly significant for applications like streaming media delivering such as audio, video, or television, for example.

Figure 8:
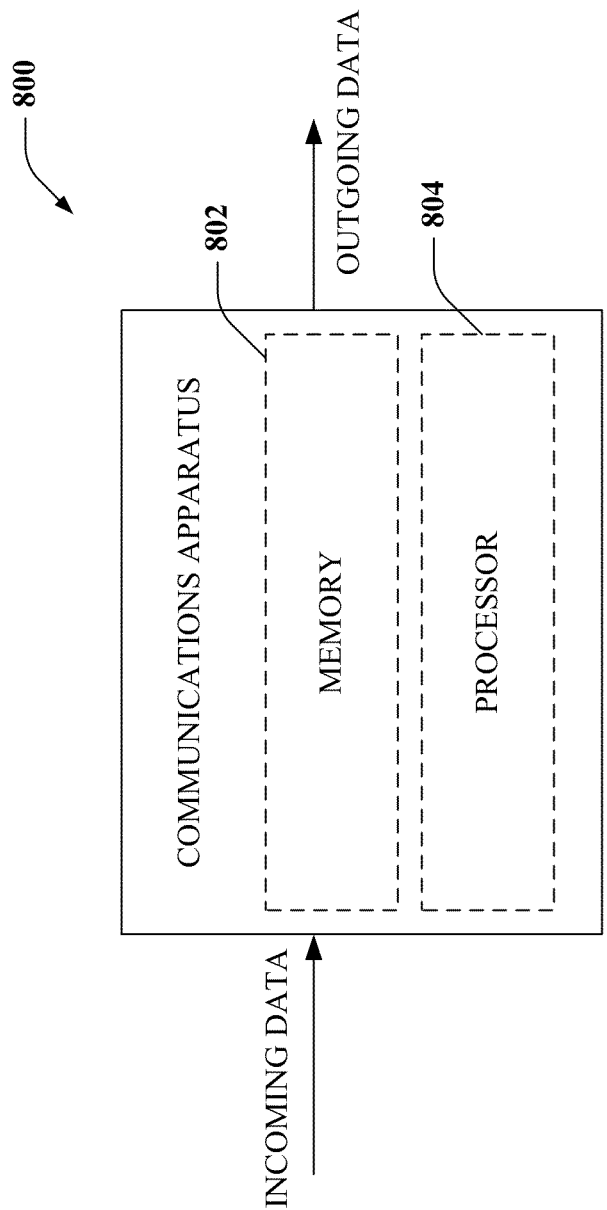
FIG. 8 illustrates an example communications apparatus that employs adaptive tracking.

FIG. 8 illustrates a communications apparatus 800 that can be a wireless communications apparatus, for instance, such as a wireless terminal. Additionally or alternatively, communications apparatus 800 can be resident within a wired network. Communications apparatus 800 can include memory 802 that can retain instructions for performing a signal analysis in a wireless communications terminal. Additionally, communications apparatus 800 may include a processor 804 that can execute instructions within memory 802 and/or instructions received from another network device, wherein the instructions can relate to configuring or operating the communications apparatus 800 or a related communications apparatus.

Figure 9:
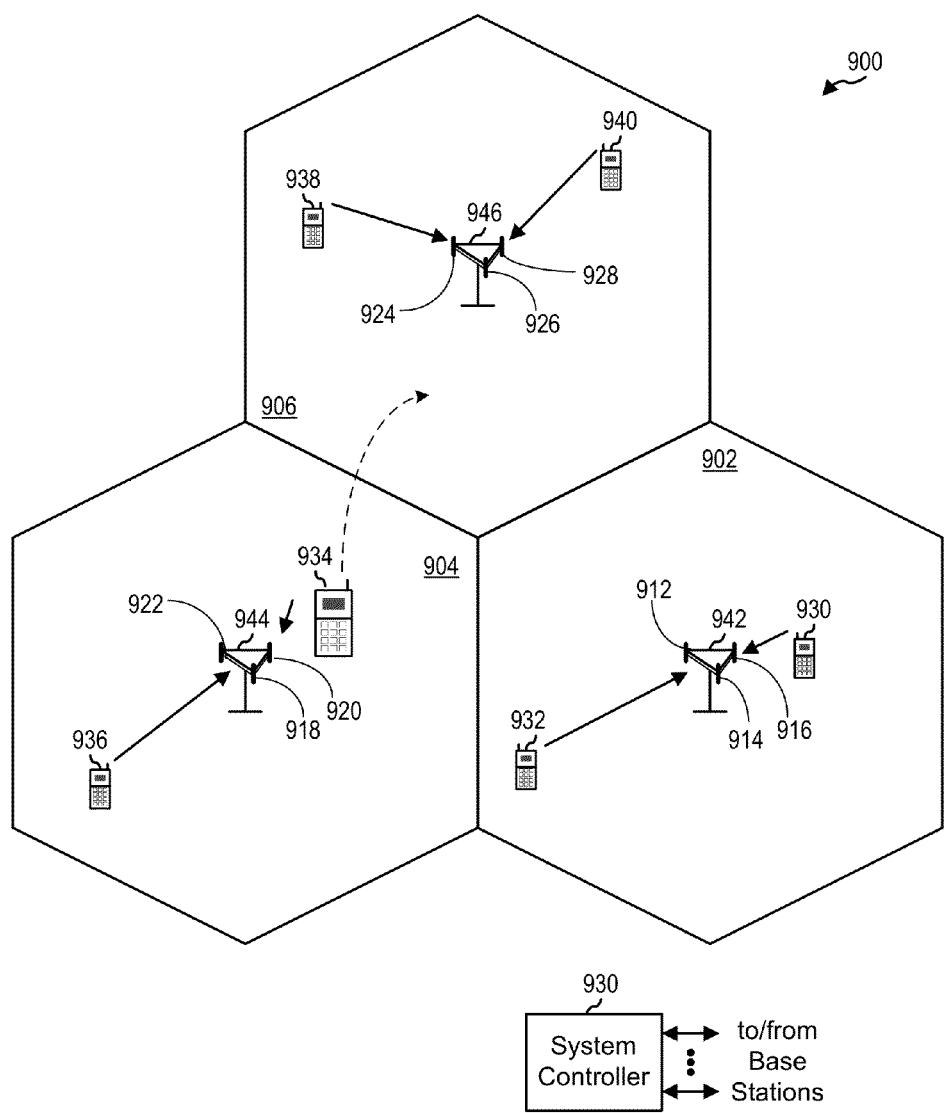
FIG. 9 illustrates a multiple access wireless communication system that employs adaptive tracking.

Referring to FIG. 9, a multiple access wireless communication system 900 is illustrated. The multiple access wireless communication system 900 includes multiple cells, including cells 902, 904, and 906. In the aspect the system 900, the cells 902, 904, and 906 may include a Node B that includes multiple sectors. The multiple sectors can be formed by groups of antennas with each antenna responsible for communication with UEs in a portion of the cell. For example, in cell 902, antenna groups 912, 914, and 916 may each correspond to a different sector. In cell 904, antenna groups 918, 920, and 922 each correspond to a different sector. In cell 906, antenna groups 924, 926, and 928 each correspond to a different sector. The cells 902, 904 and 906 can include several wireless communication devices, e.g., User Equipment or UEs, which can be in communication with one or more sectors of each cell 902, 904 or 906. For example, UEs 930 and 932 can be in communication with Node B 942, UEs 934 and 936 can be in communication with Node B 944, and UEs 938 and 940 can be in communication with Node B 946.

Figure 10:
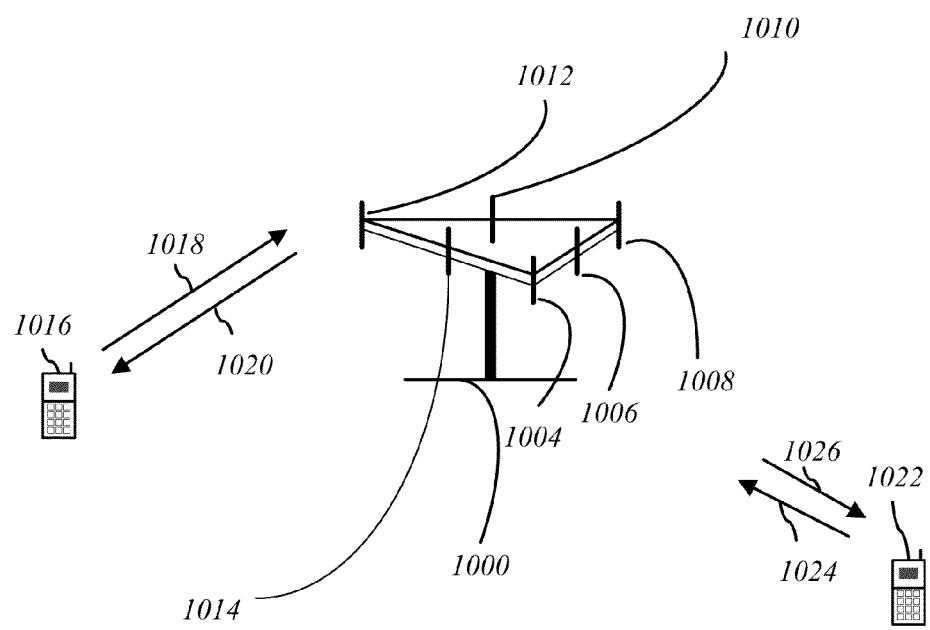
FIGS. 10 and 11 illustrate example communications systems that employ adaptive tracking.

Referring now to FIG. 10, a multiple access wireless communication system according to one aspect is illustrated. An access point 1000 (AP) includes multiple antenna groups, one including 1004 and 1006, another including 1008 and 1010, and an additional including 1012 and 1014. In FIG. 10, only two antennas are shown for each antenna group, however, more or fewer antennas may be utilized for each antenna group. Access terminal 1016 (AT) is in communication with antennas 1012 and 1014, where antennas 1012 and 1014 transmit information to access terminal 1016 over forward link 1020 and receive information from access terminal 1016 over reverse link 1018. Access terminal 1022 is in communication with antennas 1006 and 1008, where antennas 1006 and 1008 transmit information to access terminal 1022 over forward link 1026 and receive information from access terminal 1022 over reverse link 1024. In a FDD system, communication links 1018, 1020, 1024 and 1026 may use different frequency for communication. For example, forward link 1020 may use a different frequency then that used by reverse link 1018.

Each group of antennas and/or the area in which they are designed to communicate is often referred to as a sector of the access point. Antenna groups each are designed to communicate to access terminals in a sector, of the areas covered by access point 1000. In communication over forward links 1020 and 1026, the transmitting antennas of access point 1000 utilize beam-forming in order to improve the signal-to-noise ratio of forward links for the different access terminals 1016 and 1024. Also, an access point using beam-forming to transmit to access terminals scattered randomly through its coverage causes less interference to access terminals in neighboring cells than an access point transmitting through a single antenna to all its access terminals. An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 11:
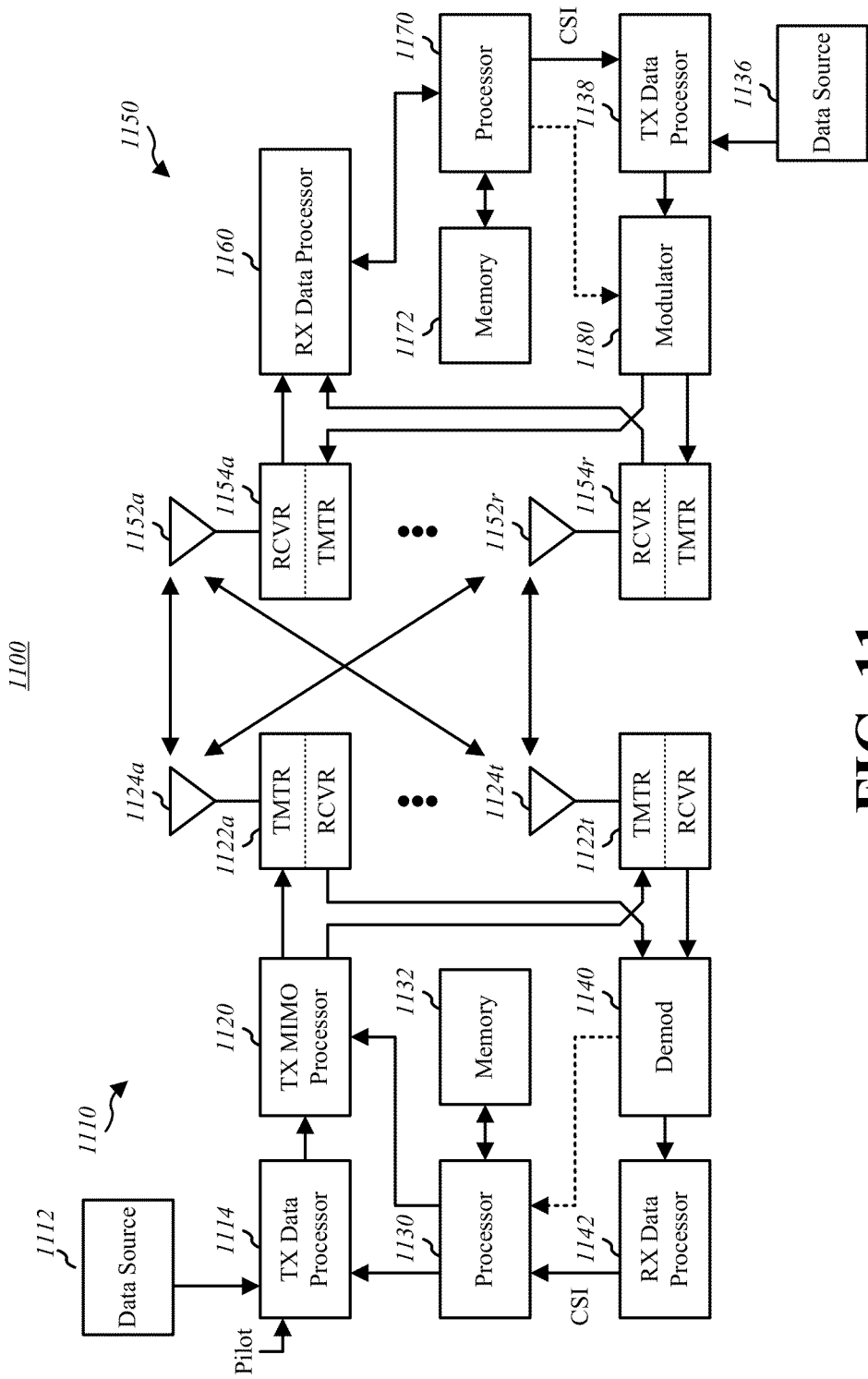

Referring to FIG. 11, a system 1100 illustrates a transmitter system 210 (also known as the access point) and a receiver system 1150 (also known as access terminal) in a MIMO system 1100. At the transmitter system 1110, traffic data for a number of data streams is provided from a data source 1112 to a transmit (TX) data processor 1114. Each data stream is transmitted over a respective transmit antenna. TX data processor 1114 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 1130.

The modulation symbols for all data streams are then provided to a TX MIMO processor 1120, which may further process the modulation symbols (e.g., for OFDM). TX MIMO processor 1120 then provides NT modulation symbol streams to NT transmitters (TMTR) 1122a through 1122t. In certain embodiments, TX MIMO processor 1120 applies beam-forming weights to the symbols of the data streams and to the antenna from which the symbol is being transmitted.

Each transmitter 1122 receives and processes a respective symbol stream to provide one or more analog signals, and further conditions (e.g., amplifies, filters, and up-converts) the analog signals to provide a modulated signal suitable for transmission over the MIMO channel. NT modulated signals from transmitters 1122a through 1122t are then transmitted from NT antennas 1124a through 1124t, respectively.

At receiver system 1150, the transmitted modulated signals are received by NR antennas 1152a through 1152r and the received signal from each antenna 1152 is provided to a respective receiver (RCVR) 1154a through 1154r. Each receiver 1154 conditions (e.g., filters, amplifies, and down-converts) a respective received signal, digitizes the conditioned signal to provide samples, and further processes the samples to provide a corresponding "received" symbol stream.

An RX data processor 1160 then receives and processes the NR received symbol streams from NR receivers 1154 based on a particular receiver processing technique to provide NT "detected" symbol streams. The RX data processor 1160 then demodulates, de-interleaves, and decodes each detected symbol stream to recover the traffic data for the data stream. The processing by RX data processor 1160 is complementary to that performed by TX MIMO processor 1120 and TX data processor 1114 at transmitter system 1110.

A processor 1170 periodically determines which pre-coding matrix to use (discussed below). Processor 1170 formulates a reverse link message comprising a matrix index portion and a rank value portion. The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by transmitters 1154a through 1154r, and transmitted back to transmitter system 1110.

At transmitter system 1110, the modulated signals from receiver system 1150 are received by antennas 1124, conditioned by receivers 1122, demodulated by a demodulator 1140, and processed by a RX data processor 1142 to extract the reserve link message transmitted by the receiver system 1150. Processor 1130 then determines which pre-coding matrix to use for determining the beam-forming weights then processes the extracted message.

Figure 12:
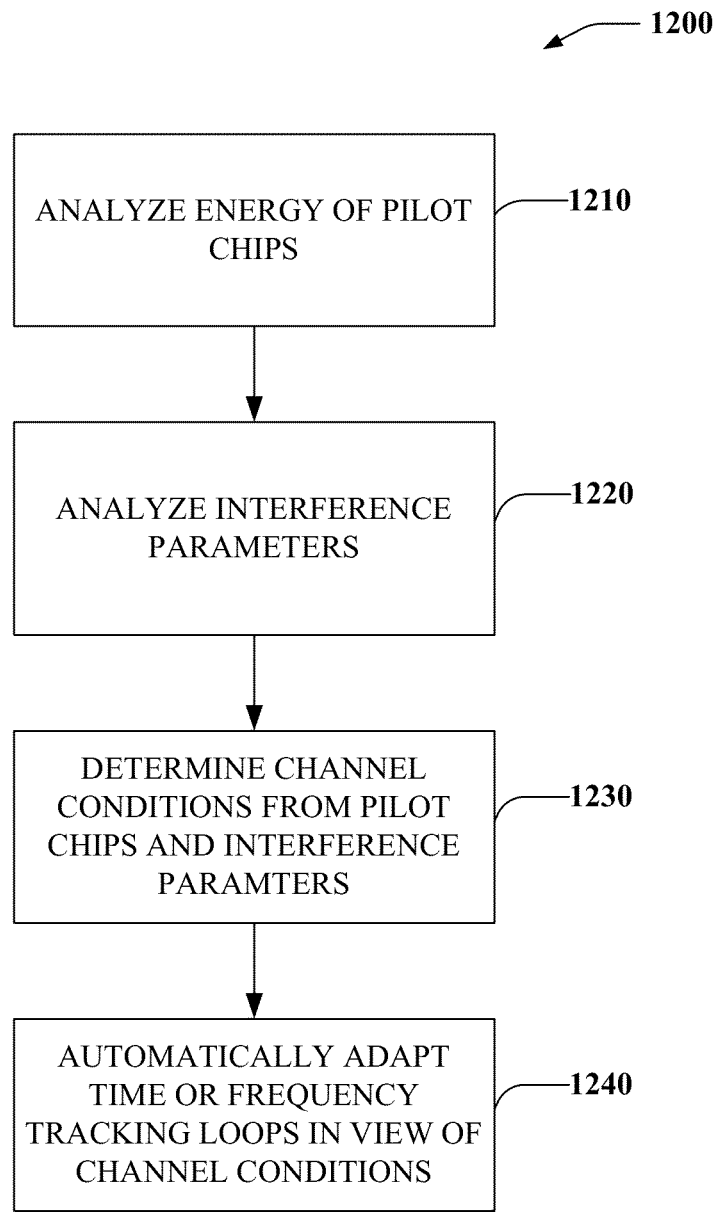
FIG. 12 is a flow diagram of automated adaptive tracking for a wireless communications system.

Referring now to FIG. 12, a wireless communications methodology 1200 is illustrated. While, for purposes of simplicity of explanation, the methodology is shown and described as a series of acts, it is to be understood and appreciated that the methodology is not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with the claimed subject matter.

Proceeding to 1210, energy of pilot chips is analyzed. This can also include analysis of substantially any type of signal quality parameter such as signal-to-noise ratio and so forth. At 1220, an interference parameter is determined. As noted previously, from the parameters determined at 1210 and 1220, channel conditions can be determined at 1230 such as an estimate for Ecp which is the chip pilot energy to interference ratio. As can be appreciated, other signal quality ratios could be processed. At 1240, tracking and/or frequency loops are automatically adjusted (e.g., loop gains adjusted up or down) in view of the determined channel conditions analyzed at 1230. As noted previously, such tracking loops can include time tracking loops and/or frequency tracking loops.

As noted previously, the adaptive tracking steps can be automatically or dynamically adjusted for time and frequency racking loops in a wireless communications network. Signal conditions are automatically analyzed to determine present signal quality for a given location of a device. For instance, it may be determined that a device is in a given high geometry location and respective tracking gains for time or frequency loops can be automatically decreased. In a low geometry situations where signal conditions are detected as poor, time or frequency loop gains can be automatically increased in an incremental or step-wise manner (e.g., increase gain in increments of 1 or 2 db). Such adaptive adjustments to detected conditions are controlled in a smooth and incremental manner via adaptive step control. This type of control enables time or frequency loop gains to be automatically tracked to the detected conditions while minimizing overshoot (e.g., going past desired gain positions) and optimizing the wireless receiver in view of the detected conditions.

The techniques processes described herein may be implemented by various means. For example, these techniques may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors.

Figure 13:
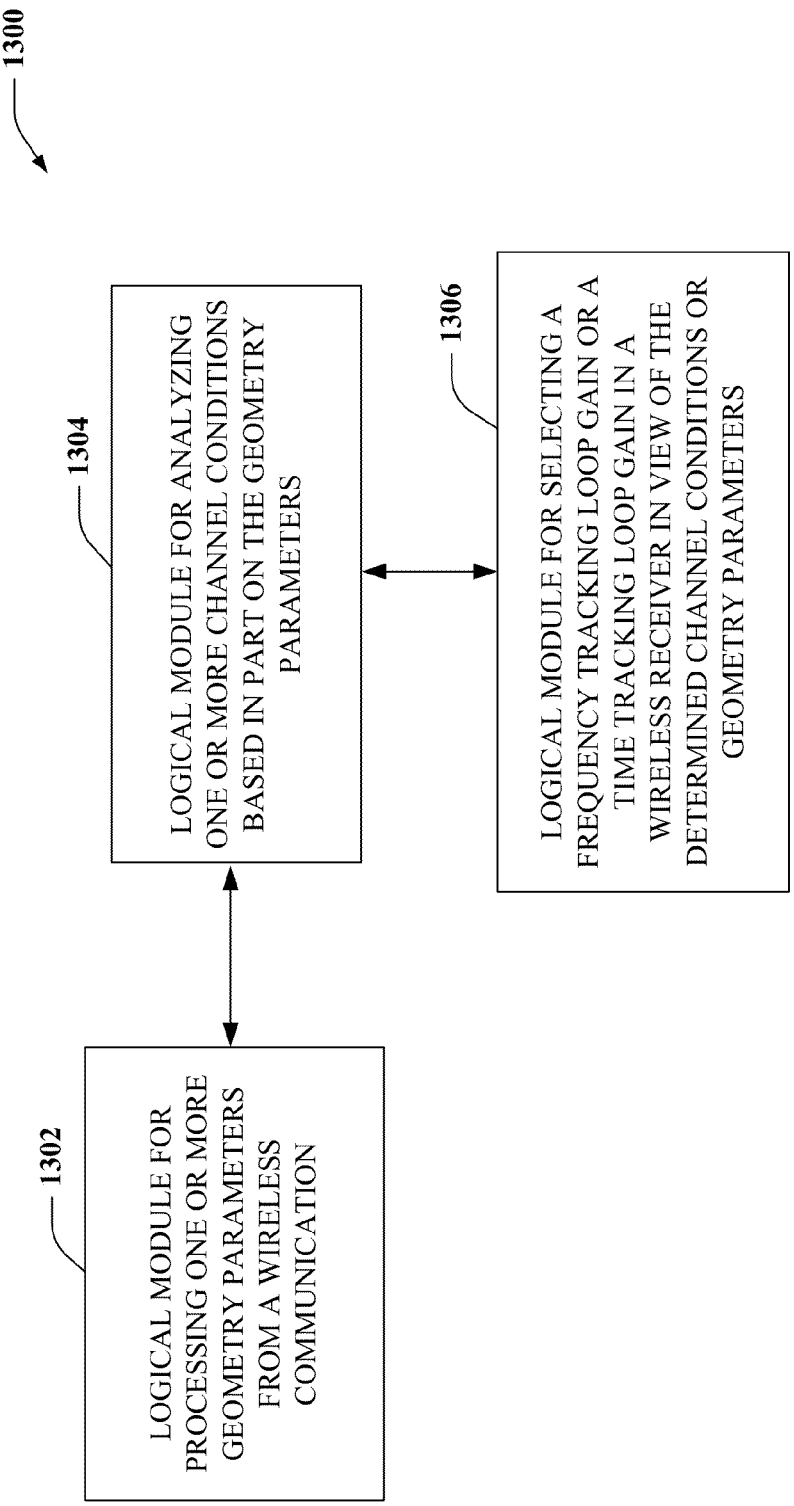
FIG. 13 illustrates an example logical module for adaptive tracking

Turning now to FIG. 13, a system is provided that relates to wireless signal processing. The system is represented as a series of interrelated functional blocks, which can represent functions implemented by a processor, software, hardware, firmware, or any suitable combination thereof.

Referring to FIG. 13, a wireless communication system 1300 is provided. The system 1300 includes a logical module 1302 or means for processing one or more geometry parameters from a wireless communication. This includes a logical module 1304 or means for analyzing one or more channel conditions based in part on the geometry parameters. This also includes a logical module 1306 or means for selecting a frequency tracking loop gain or a time tracking loop gain in a wireless receiver in view of the determined channel conditions or geometry parameters.

Figure 14:
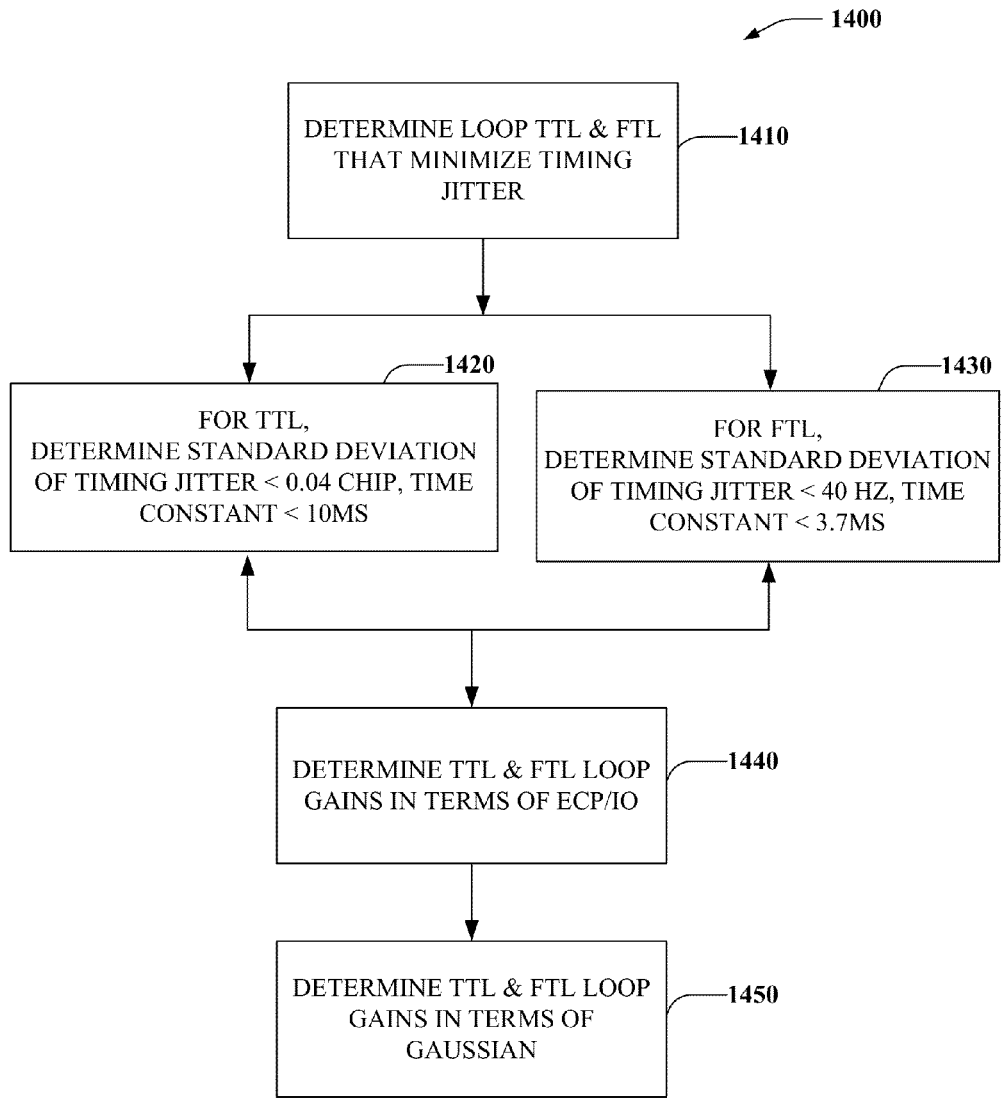
FIG. 14 illustrates a method for setting time tracking and frequency tracking loop gains in a wireless communications system.

FIG. 14 illustrates a method 1400 for setting time tracking and frequency tracking loop gains in a wireless communications system. As noted above, it was discovered that a relationship exists between the timing jitter (measured in standard deviation) and the time tracking loop (TTL) TC (time constant). Proceeding to act 1410, determine the TTL and FTL loop gain that minimizes the timing jitter as much as possible while maintaining the time constant similar to that of the low-geometry case. For example, select 256(=2^8) in this channel condition. The optimal time constant between and around the two geometries can be extrapolated and interpolated to cover the operating geometries. A similar analysis leads one to select 1024 FTL loop gain for −11 dB geometry and 64 for 15 dB geometry, for example. Similar procedures are provided in interpolation and extrapolation to cover the operating geometries. The previous analysis are for −11 dB and 15 dB geometries. For example, sweep the geometry from −11 dB to 15 dB and calculate the appropriate loop gains. The following criteria are used to determine suitable loop gains.

Loop gain selection criteria (criterion 1) at acts 1420 and 1430: Select the loop gain that minimizes the time/frequency jitter as much as possible while satisfying the following conditions:

In the case of TTL at act 1420: determine standard deviation of timing jitter <0.04 chip, time constant <10 ms.

In the case of FTL at act 1430: determine standard deviation of timing jitter <40 Hz, time constant <3.7 ms. Different criteria can be used in FTL and TTL in order to be consistent with the previous default loop gains.

At act 1440, loop gains can be approximated in terms of Ecp/Io by:

TTL: log 2(TTLgain)=−0.3341*(*Ecp/Io*)+4.5560

FTL: log 2(FTLgain)=−0.3330*(*Ecp/Io*)+2.4077, where Ecp/Io is in dB unit.

In fact, $10*\log_{10}(9*(2^{11})*Ecp/Io)$ is available from the channel quality indicator (CQI) algorithm. Denote this as X. Then, from the above relationship, implement this table at act 1450 in terms of a Gaussian as:

For TTL: TTLgain=2^(19−Gaussian(X/3))

For FTL: FTLgain=2^(17−Gaussian(X/3)),

For robustness, limit the dynamic range of TTL/FTL gains as follows.

[128,32]<=[TTL, FTL]<=[4096,1024].

In another aspect, a communications apparatus is provided. This includes a memory that retains instructions for analyzing one or more geometry parameters from a wireless communication, processing one or more channel conditions based in part on the geometry parameters, and dynamically adjusting a frequency tracking loop gain or a time tracking loop gain in a wireless receiver in view of the determined channel conditions or geometry parameters; and a processor that executes the instructions. The channel conditions are based in part on an energy of pilot chip versus total receive energy parameter (Ecp/Io), a signal to noise ratio (SNR), or a pilot energy over noise plus interference ratio (Ecp/Nt).

In another aspect, a computer program product is provided that includes a computer-readable medium that includes code for adaptive step control, the code comprising: code for causing a computer to monitor a plurality of geometry parameters from a wireless communication; code for causing a computer to process one or more channel conditions based in part on the plurality of geometry parameters; and code for causing a computer to regulate a frequency tracking loop gain or a time tracking loop gain in a wireless receiver in view of the determined channel conditions or the plurality of geometry parameters. This can also include analyzing one or more channel condition parameters for a multiple input, multiple output (mimo) system.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. Logical Traffic Channels comprise a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises: Common Pilot Channel (CPICH), Synchronization Channel (SCH), Common Control Channel (CCCH), Shared DL Control Channel (SD-CCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), and Load Indicator Channel (LICH), for example.

The UL PHY Channels comprises: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), and Broadband Pilot Channel (BPICH), for example.

Other terms/components include: 3G 3rd Generation, 3GPP 3rd Generation Partnership Project, ACLR Adjacent channel leakage ratio, ACPR Adjacent channel power ratio, ACS Adjacent channel selectivity, ADS Advanced Design System, AMC Adaptive modulation and coding, A-MPR Additional maximum power reduction, ARQ Automatic repeat request, BCCH Broadcast control channel, BTS Base transceiver station, CDD Cyclic delay diversity, CCDF Complementary cumulative distribution function, CDMA Code division multiple access, CFI Control format indicator, Co-MIMO Cooperative MIMO, CP Cyclic prefix, CPICH Common pilot channel, CPRI Common public radio interface, CQI Channel quality indicator, CRC Cyclic redundancy check, DCI Downlink control indicator, DFT Discrete Fourier transform, DFT-SOFDM Discrete Fourier transform spread OFDM, DL Downlink (base station to subscriber transmission), DL-SCH Downlink shared channel, D-PHY 500 Mbps physical layer, DSP Digital signal processing, DT Development toolset, DVSA Digital vector signal analysis, EDA Electronic design automation, E-DCH Enhanced dedicated channel, E-UTRAN Evolved UMTS terrestrial radio access network, eMBMS Evolved multimedia broadcast multicast service, eNB Evolved Node B, EPC Evolved packet core, EPRE Energy per resource element, ETSI European Telecommunications Standards Institute, E-UTRA Evolved UTRA, E-UTRAN Evolved UTRAN, EVM Error vector magnitude, and FDD Frequency division duplex.

Still yet other terms include FFT Fast Fourier transform, FRC Fixed reference channel, FS1 Frame structure type 1, FS2 Frame structure type 2, GSM Global system for mobile communication, HARQ Hybrid automatic repeat request, HDL Hardware description language, HI HARQ indicator, HSDPA High speed downlink packet access, HSPA High speed packet access, HSUPA High speed uplink packet access, IFFT Inverse FFT, IOT Interoperability test, IP Internet protocol, LO Local oscillator, LTE Long term evolution, MAC Medium access control, MBMS Multimedia broadcast multicast service, MBSFN Multicast/broadcast over single-frequency network, MCH Multicast channel, MIMO Multiple input multiple output, MISO Multiple input single output, MME Mobility management entity, MOP Maximum output power, MPR Maximum power reduction, MU-MIMO Multiple user MIMO, NAS Non-access stratum, OBSAI Open base station architecture interface, OFDM Orthogonal frequency division multiplexing, OFDMA Orthogonal frequency division multiple access, PAPR Peak-to-average power ratio, PAR Peak-to-average ratio, PBCH Physical broadcast channel, P-CCPCH Primary common control physical channel, PCFICH Physical control format indicator channel, PCH Paging channel, PDCCH Physical downlink control channel, PDCP Packet data convergence protocol, PDSCH Physical downlink shared channel, PHICH Physical hybrid ARQ indicator channel, PHY Physical layer, PRACH Physical random access channel, PMCH Physical multicast channel, PMI Pre-coding matrix indicator, P-SCH Primary synchronization signal, PUCCH Physical uplink control channel, and PUSCH Physical uplink shared channel.

Other terms include QAM Quadrature amplitude modulation, QPSK Quadrature phase shift keying, RACH Random access channel, RAT Radio access technology, RB Resource block, RF Radio frequency, RFDE RF design environment, RLC Radio link control, RMC Reference measurement channel, RNC Radio network controller, RRC Radio resource control, RRM Radio resource management, RS Reference signal, RSCP Received signal code power, RSRP Reference signal received power, RSRQ Reference signal received quality, RSSI Received signal strength indicator, SAE System architecture evolution, SAP Service access point, SC-FDMA Single carrier frequency division multiple access, SFBC Space-frequency block coding, S-GW Serving gateway, SIMO Single input multiple output, SISO Single input single output, SNR Signal-to-noise ratio, SRS Sounding reference signal, S-SCH Secondary synchronization signal, SU-MIMO Single user MIMO, TDD Time division duplex, TDMA Time division multiple access, TR Technical report, TrCH Transport channel, TS Technical specification, TTA Telecommunications Technology Association, TTI Transmission time interval, UCI Uplink control indicator, UE User equipment, UL Uplink (subscriber to base station transmission), UL-SCH Uplink shared channel, UMB Ultra-mobile broadband, UMTS Universal mobile telecommunications system, UTRA Universal terrestrial radio access, UTRAN Universal terrestrial radio access network, VSA Vector signal analyzer, W-CDMA Wideband code division multiple access It is noted that various aspects are described herein in connection with a terminal. A terminal can also be referred to as a system, a user device, a subscriber unit, subscriber station, mobile station, mobile device, remote station, remote terminal, access terminal, user terminal, user agent, or user equipment. A user device can be a cellular telephone, a cordless telephone, a Session Initiation Protocol (SIP) phone, a wireless local loop (WLL) station, a PDA, a handheld device having wireless connection capability, a module within a terminal, a card that can be attached to or integrated within a host device (e.g., a PCMCIA card) or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

As used in this application, the terms "component," "module," "system," "protocol," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A wireless communications method, comprising:
   determining one or more channel conditions; and
   automatically adjusting a frequency tracking loop gain or a time tracking loop gain based on the one or more channel conditions, according to one of:
      a first defined relationship between a first standard deviation of timing jitters and a first time constant of a frequency tracking loop or a time tracking loop in a wireless receiver in accordance with a low-geometry case having associated channel conditions, or
      a second defined relationship between a second standard deviation of timing jitters and a second time constant of the frequency tracking loop or the time tracking loop in accordance with a high-geometry case having associated channel conditions, wherein each of the frequency tracking loop gain and the time tracking loop gain is an integer exponential of 2, and the frequency tracking loop gain is set to be a factor of four lower than the time tracking loop gain.

2. The method of claim 1, wherein the one or more channel conditions are based in part on an energy of pilot chip versus total received energy parameter (Ecp/Io).

3. The method of claim 1, wherein the one or more channel conditions are based on a signal to noise ratio (SNR).

4. The method of claim 1, wherein the one or more channel conditions are based on a pilot energy over noise plus interference ratio (Ecp/Nt).

5. The method of claim 1, wherein the one or more channel conditions are based on downlink power, uplink power, tracking loop errors, detected urban conditions, or Doppler parameters.

6. The method of claim 5, wherein automatically adjusting further comprises incrementally increasing or decreasing step gain parameters based in part on the one or more channel conditions.

7. The method of claim 1, further comprising automatically adjusting the frequency tracking loop gain or the time tracking loop gain in accordance with a demodulator component.

8. The method of claim 1, further comprising automatically adjusting the frequency tracking loop gain or the time tracking loop gain in accordance with a searcher component.

9. The method of claim 1, further comprising automatically adjusting the frequency tracking loop gain or the time tracking loop gain in accordance with a rake, an equalizer, or a finger component.

10. The method of claim 1, further comprising analyzing operating conditions including high geometry, low geometry, or stationary, and optimizing gains in a rake or an equalizer in view of the operating conditions.

11. The method of claim 10, further comprising analyzing a channel status indicator (CSI) to optimize a feedback rate for a Multiple Input, Multiple Output (MIMO) system.

12. The method of claim 1, further comprising analyzing geometry conditions to determine optimal time tracking loop gains.

13. The method of claim 12, further comprising analyzing geometry conditions to determine optimal frequency tracking loop gains.

14. The method of claim 1, further comprising adjusting the time tracking loop to mitigate rake timing fluctuations or adjusting the frequency tracking loop to optimize a channel impulse response (CIR).

15. The method of claim 1, further comprising extrapolating or interpolating at least one of the first time constant of the low-geometry case or the second time constant of the high-geometry case to obtain at least one corresponding optimal time constant covering operating geometries of the wireless receiver.

16. The method of claim 1, further comprising extrapolating or interpolating the frequency tracking loop gain or the time tracking loop gain of at least one of the low-geometry case or the high-geometry case to obtain a corresponding optimal loop gain covering operating geometries of the wireless receiver.

17. A communications apparatus, comprising:
   a memory that retains instructions for processing one or more channel conditions, and dynamically adjusting a frequency tracking loop gain or a time tracking loop gain based on the one or more channel conditions, according to one of:

a first defined relationship between a first standard deviation of timing jitters and a first time constant of a frequency tracking loop or a time tracking loop in a wireless receiver in accordance with a low-geometry case having associated channel conditions, or a second defined relationship between a second standard deviation of timing jitters and a second time constant of the frequency tracking loop or the time tracking loop in accordance with a high-geometry case having associated channel conditions, wherein each of the frequency tracking loop gain and the time tracking loop gain is an integer exponential of 2, and the frequency tracking loop gain is set to be a factor of four lower than the time tracking loop gain; and a processor that executes the instructions.

18. The communications apparatus of claim 17, wherein the one or more channel conditions are based in part on an energy of pilot chip versus total receive energy parameter (Ecp/Io), a signal to noise ratio (SNR), or a pilot energy over noise plus interference ratio (Ecp/Nt).

19. The communications apparatus of claim 17, wherein the one or more channel conditions are based on downlink power, uplink power, tracking loop errors, detected urban conditions, or Doppler parameters.

20. The communications apparatus of claim 19, further comprising instructions for incrementally increasing or decreasing step gain parameters based in part on the one or more channel conditions.

21. The communications apparatus of claim 17, further comprising instructions for automatically adjusting the frequency tracking loop gain or the time tracking loop gain in accordance with a demodulator component, a searcher component, a rake, an equalizer, or a finger component.

22. The communications apparatus of claim 17, further comprising instructions for analyzing operating conditions including high geometry, low geometry, or stationary, and optimizing gains in a rake or an equalizer in view of the operating conditions.

23. The communications apparatus of claim 22, further comprising instructions for analyzing a channel status indicator (CSI) to optimize a feedback rate for a multiple-in, multiple-out (MIMO) system.

24. The communications apparatus of claim 22, further comprising instructions for analyzing the one or more channel conditions to determine optimal time tracking loop gains or frequency tracking loop gains.

25. The communications apparatus of claim 17, further comprising instructions for adjusting the time tracking loop to mitigate rake timing fluctuations or adjusting the frequency tracking loop to optimize a channel impulse response (CIR).

26. A communications apparatus, comprising:
means for determining one or more channel conditions; and
means for selecting a frequency tracking loop gain or a time tracking loop gain based on the one or more channel conditions, according to one of:
a first defined relationship between a first standard deviation of timing jitters and a first time constant of a frequency tracking loop or a time tracking loop in a wireless receiver in accordance with a low-geometry case having associated channel conditions, or
a second defined relationship between a second standard deviation of timing jitters and a second time constant of the frequency tracking loop or the time tracking loop in accordance with a high-geometry case having associated channel conditions, wherein each of the frequency tracking loop gain and the time tracking loop gain is an integer exponential of 2, and the frequency tracking loop gain is set to be a factor of four lower than the time tracking loop gain.

27. The communications apparatus of claim 26, wherein the one or more channel conditions are based in part on an energy of pilot chip versus total receive energy parameter (Ecp/Io), a signal to noise ratio (SNR), or a pilot energy over noise plus interference ratio (Ecp/Nt).

28. The communications apparatus of claim 26, further comprising means for extrapolating or interpolating at least one of the first time constant of the low-geometry case or the second time constant of the high-geometry case to obtain at least one corresponding optimal time constant covering operating geometries of the wireless receiver.

29. The communications apparatus of claim 26, further comprising means for extrapolating or interpolating the frequency tracking loop gain or the time tracking loop gain of at least one of the low-geometry case or the high-geometry case to obtain a corresponding optimal loop gain covering operating geometries of the wireless receiver.

30. A non-transitory computer-readable medium that includes code for adaptive step control, the code comprising:
code for causing a computer to process one or more channel conditions; and
code for causing the computer to regulate a frequency tracking loop gain or a time tracking loop gain based on the one or more channel conditions, according to one of:
a first defined relationship between a first standard deviation of timing jitters and a first time constant of a frequency tracking loop or a time tracking loop in a wireless receiver in accordance with a low-geometry case having associated channel conditions, or
a second defined relationship between a second standard deviation of timing jitters and a second time constant of the frequency tracking loop or the time tracking loop in accordance with a high-geometry case having associated channel conditions, wherein each of the frequency tracking loop gain and the time tracking loop gain is an integer exponential of 2, and the frequency tracking loop gain is set to be a factor of four lower than the time tracking loop gain.

31. The computer-readable medium of claim 30, wherein the one or more channel conditions are based in part on an energy of pilot chip versus total receive energy parameter (Ecp/Io), a signal to noise ratio (SNR), or a pilot energy over noise plus interference ratio (Ecp/Nt).

32. A communications apparatus, comprising:
a demodulator component to determine one or more channel conditions from a wireless communication;
a finger component to analyze time tracking parameters or frequency error parameters in accordance with the one or more channel conditions; and
a common pilot processor to automatically adjust a frequency tracking loop gain or a time tracking loop gain based on the one or more channel conditions, according to one of:
a first defined relationship between a first standard deviation of timing jitters and a first time constant of a frequency tracking loop or a time tracking loop in a wireless receiver in accordance with a low-geometry case having associated time tracking parameters, frequency error parameters, or channel conditions, or
a second defined relationship between a second standard deviation of timing jitters and a second time constant of the frequency tracking loop or the time tracking loop in accordance with a high-geometry case having associated time tracking parameters, frequency error parameter, or channel conditions, wherein each of the frequency tracking loop gain and the time tracking loop gain is an integer exponential of 2, and the frequency tracking loop gain is set to be a factor of four lower than the time tracking loop gain.

33. The communications apparatus of claim 32, wherein the common pilot processor is operatively coupled to a modem digital signal processor (MDSP), where the MDSP enables demodulation, channel quality estimation, or finger management.

34. The communications apparatus of claim 32, further comprising a searcher component to adjust the frequency tracking loop gain or the time tracking loop gain in the wireless receiver.

35. The communications apparatus of claim 32, further comprising a radio frequency (RF) processor, a low noise amplifier, an automatic gain control, a transmitter component, or a general processor to adjust the frequency tracking loop gain or the time tracking loop gain in the wireless receiver.

36. The communications apparatus of claim 32, wherein the common pilot processor is configured to extrapolating or interpolating at least one of the first time constant of the low-geometry case or the second time constant of the high-geometry case to obtain at least one corresponding optimal time constant covering operating geometries of the wireless receiver.

37. The communications apparatus of claim 32, wherein the common pilot processor is configured to extrapolate or interpolate the frequency tracking loop gain or the time tracking loop gain of at least one of the low-geometry case or the high-geometry case to obtain a corresponding optimal loop gain covering operating geometries of the wireless receiver.

\* \* \* \* \*